(12) United States Patent
Norris et al.

(10) Patent No.: US 8,156,099 B2
(45) Date of Patent: Apr. 10, 2012

(54) INTERPRETING LOCAL SEARCH QUERIES

(75) Inventors: James Norris, Mountain View, CA (US);
Gregory John Donaker, Brooklyn, NY (US); Nina Weiyu Kang, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/029,847

(22) Filed: Feb. 17, 2011

(65) Prior Publication Data
US 2011/0145247 A1 Jun. 16, 2011

Related U.S. Application Data

(63) Continuation of application No. 11/775,066, filed on Jul. 9, 2007, now Pat. No. 7,917,490.

(51) Int. Cl.
*G06F 17/00* (2006.01)
(52) U.S. Cl. ........ 707/706; 707/707; 707/713; 707/722; 707/736; 707/758; 707/781; 707/802; 707/822; 709/201; 705/14.58
(58) Field of Classification Search .................. 707/706, 707/707, 713, 722, 736, 758, 781, 802, 822, 707/999.003, 999.007, 999.01; 709/201; 705/14.58
See application file for complete search history.

(56) References Cited

U.S. PATENT DOCUMENTS

| 7,606,798 | B2 | 10/2009 | Ge et al. | |
|---|---|---|---|---|
| 2005/0131872 | A1* | 6/2005 | Calbucci et al. | 707/3 |
| 2006/0149734 | A1 | 7/2006 | Egnor et al. | |
| 2006/0212433 | A1* | 9/2006 | Stachowiak et al. | 707/3 |
| 2006/0230033 | A1* | 10/2006 | Halevy et al. | 707/3 |
| 2008/0243821 | A1* | 10/2008 | Delli Santi et al. | 707/5 |

FOREIGN PATENT DOCUMENTS

| EP | 1 555 625 A1 | 7/2005 |
|---|---|---|
| WO | WO 2006/083939 A2 | 8/2006 |
| WO | WO 2006/108069 A2 | 10/2006 |
| WO | WO 2007/027608 A2 * | 3/2007 |

OTHER PUBLICATIONS

Co-pending U.S. Appl. No. 11/775,066, filed Jul. 9, 2007 entitled "Interpreting Local Search Queries" by James Norris et al., 44 pages.
International Search Report and Written opinion mailed Oct. 27, 2008 issued in corresponding international application No. PCT/US2008/069388, 15 pages.

* cited by examiner

*Primary Examiner* — Syling Yen
(74) *Attorney, Agent, or Firm* — Harrity & Harrity, LLP

(57) ABSTRACT

A search query may be interpreted as a number of possible interpretations, and each interpretation may be explored before the results of the search are sent to a user. In one embodiment, a device may split the search query into partitions. Each of the partitions may be submitted, as a search query, to search repositories. Confidence scores based on the results returned from the repositories may be used to determine a measure of confidence of the repository in the search query interpretation.

32 Claims, 11 Drawing Sheets

INTERPRETING LOCAL SEARCH QUERIES

RELATED APPLICATION

This application is a continuation of U.S. Patent Application No. 11/775,066, filed Jul. 9,2007, which is incorporated herein by reference.

BACKGROUND

1. Field of the Invention

Implementations described herein relate generally to information retrieval and, more particularly, to returning results for local search queries.

2. Description of Related Art

The World Wide Web ("web") contains a vast amount of information. Locating a desired portion of the information, however, can be challenging. This problem is compounded because the information on the web is constantly changing.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links.

Local search engines are search engines that attempt to return relevant web pages and/or business listings within a specific geographic area. For a local search, a user may enter a search query associated with a geographic area in which the user is interested. The local search engine may return relevant results, such as relevant web pages pertaining to the geographic area or listings of businesses in the geographic area, to the user.

In a local search, the user may specify the geographic area in which the user is interested. Some local search engines provide separately labeled text entry fields in which the user may enter their local search query and the geographic area of interest. For example, the local search engine may present a "what" text input box and a "where" text input box to the user. The user may enter the search query, such as, for example, "pizza," in the "what" box and a location, such as "Manhattan, NY," in the "where" box. The local search engine may then conduct a search for "pizza" in which relevant business listings and/or web pages that are associated with the geographic location corresponding to "Manhattan, NY" are returned.

Some existing local search engines, instead of explicitly asking the user for separate "what" and "where" terms may present a single input search box to the user. Such an approach may be advantageous as it presents a simpler interface. The search engine may analyze the entered search query to attempt to determine the intended "what" and "where" portions. It is desirable that the analysis to partition the search query into the what and where portions reflect the user's intentions as much as possible.

SUMMARY

One aspect is directed to a method that includes receiving a search query that includes terms; splitting the terms of the search query into partitions; submitting each of the partitions, as a search query, to one of a number of repositories; and storing confidence scores for each of the submitted partitions, the confidence scores being generated based on results received from the repositories and each confidence score providing a measure of confidence associated with the results.

Yet another aspect is directed to a search engine that includes search repositories configured to perform different types of searches and a search component. The search component receives a search query from a user; and generates additional search queries based on the search query, the additional search queries each being associated with one of a number of the search repositories. The search component additionally submits the additional search queries to the search repositories; receive results returned from the search repositories for the additional search queries; and transmits search results to the user based on the results returned from the plurality of search repositories.

Yet another aspect is directed to a method including receiving a search query from a user; generating a plurality of additional search queries based on the search query; submitting the additional search queries to a plurality of search repositories; receiving search results from the plurality of search repositories for the additional search queries; selecting, based on the received search results, a plurality of the additional search queries as search queries that correspond to an optimal interpretation of the search query from the user; and transmitting a web page to the user that includes search results for the selected optimal interpretation of the search query received from the user.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Overview

Techniques are described herein for intelligently interpreting a local search query that is entered by the user as a single phrase (i.e., in a single input search box). Multiple possible interpretations may be generated for the search query. The quality of each of the possible interpretations may be explored, potentially in parallel with one another, and the "best" one of the multiple possible interpretations may be selected and used to return local search results to a user.

Figure 1:
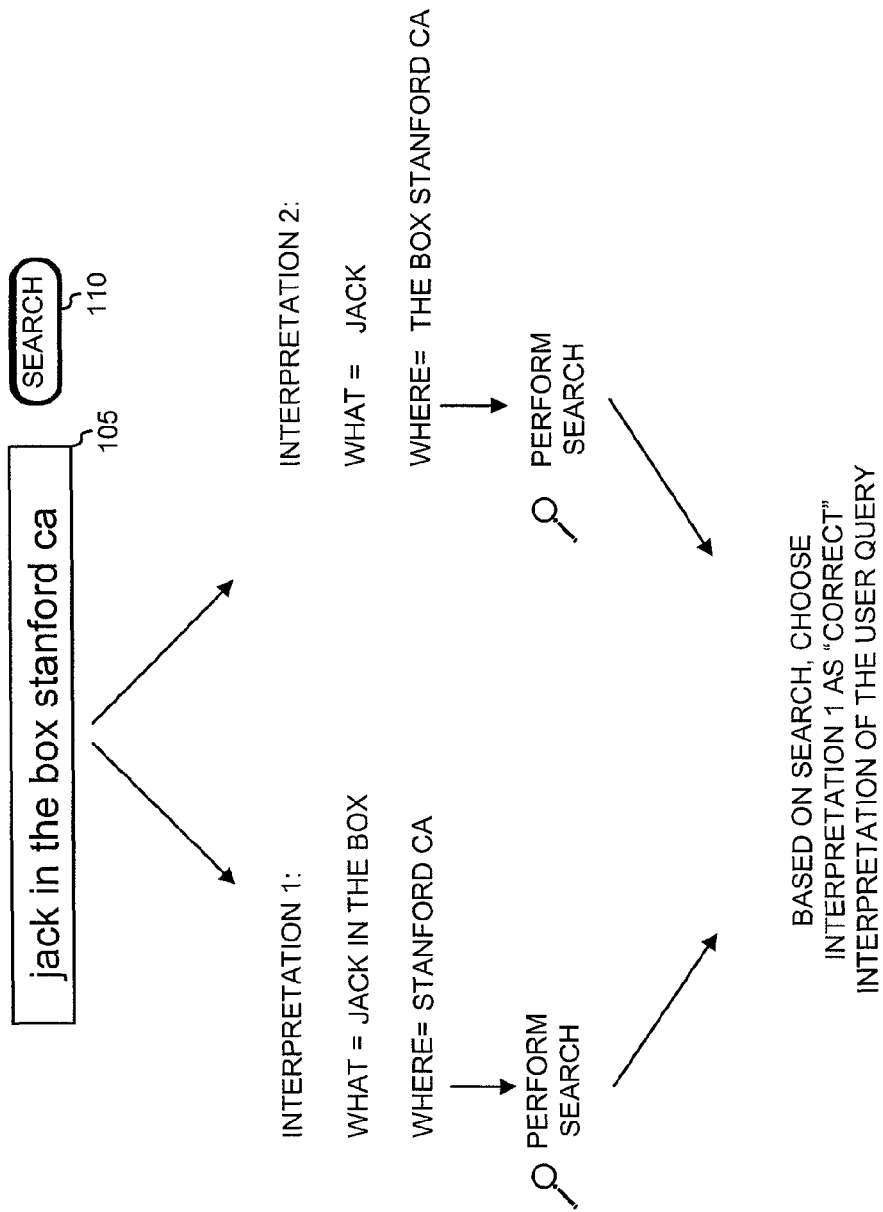
FIG. 1 is a diagram conceptually illustrating an exemplary implementation consistent with aspects of the invention.

FIG. 1 is a diagram conceptually illustrating an exemplary implementation. Assume that a user would like to find directions to the restaurant "Jack In The Box." The user may enter a search query such as "jack in the box stanford calif." in a search box 105 and then initiate a local search, such as by pressing a local search button 110. In this example, the search query indicates that the user would like to locate restaurants called "Jack In The Box" that are in Stanford, Calif. Although the "what" in this search (Jack In The Box) and the "where" (Stanford, Calif.) are clear to humans, automatically parsing the query to obtain this interpretation can be difficult. For example, a naïve automated parsing algorithm may interpret this search query as a search for the business "Jack" based on the location "The Box Stanford, Calif." The term "in" is likely to be interpretated as a separator term is removed.

Consistent with aspects described herein, a search engine may perform multiple searches, each potentially based on a different interpretation of the search query. Two interpretations are shown in FIG. 1. In the first interpretation, "jack in the box" is assumed to be the "what" portion of the query and "Stanford Calif." is assumed to be the "where" portion of the query. In the second interpretation, "jack" is assumed to be the "what" portion of the query and "the box Stanford Calif." is assumed to be the where portion of the query.

A search may be conducted using each of the possible interpretations. The results of the search may then be used to determine which of the interpretations is likely to be the interpretation that was intended by the user (i.e., the "correct" interpretation). For instance, in this example, the search results for interpretation 1 may be better than the search results for interpretation 2. The search results for interpretation 1 may thus be assumed to be the correct results and are returned to the user.

Exemplary Network Configuration

Figure 2:
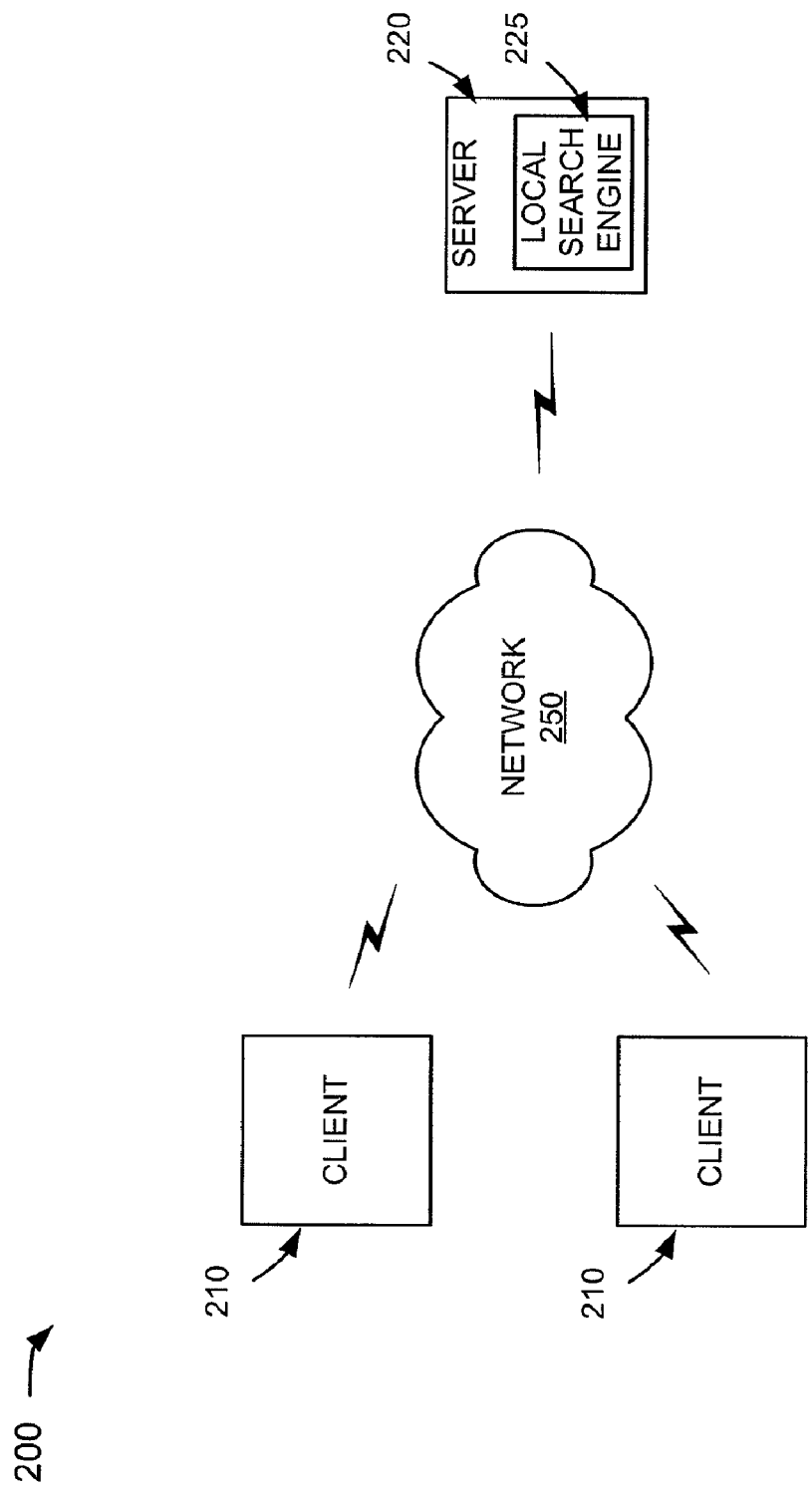
FIG. 2 is a diagram of an exemplary network in which concepts described herein may be implemented.

FIG. 2 is an exemplary diagram of a network 200 in which concepts described herein may be implemented. Network 200 may include multiple clients 210 connected to a server 220 via a network 250. Two clients 210 and one server 220 have been illustrated as connected to network 250 for simplicity. In practice, there may be more or fewer clients and servers. Also, in some instances, a client may perform the functions of a server and a server may perform the functions of a client.

Clients 210 may include a device such as a wireless telephone, a personal computer, a personal digital assistant (PDA), a lap top, or another type of computation or communication device, a thread or process running on one of these devices, and/or an object executable by one of these devices. Server 220 may include hardware and/or software to gather, process, search, and/or maintain information.

Server 220 may include a local search engine 225 usable by clients 210. The local search engine may be designed to return relevant web pages, business listings, or maps for a search relating to a geographic area. While server 220 is shown as a single entity in FIG. 2, server 220 may be implemented as multiple, potentially distributed, computing devices.

Network 250 may include a local area network (LAN), a wide area network (WAN), a telephone network, such as the Public Switched Telephone Network (PSTN), an intranet, the Internet, a memory device, or a combination of networks. Clients 210 and server 220 may connect to network 250 via wired, wireless, and/or optical connections.

Exemplary Client/Server Architecture

Figure 3:
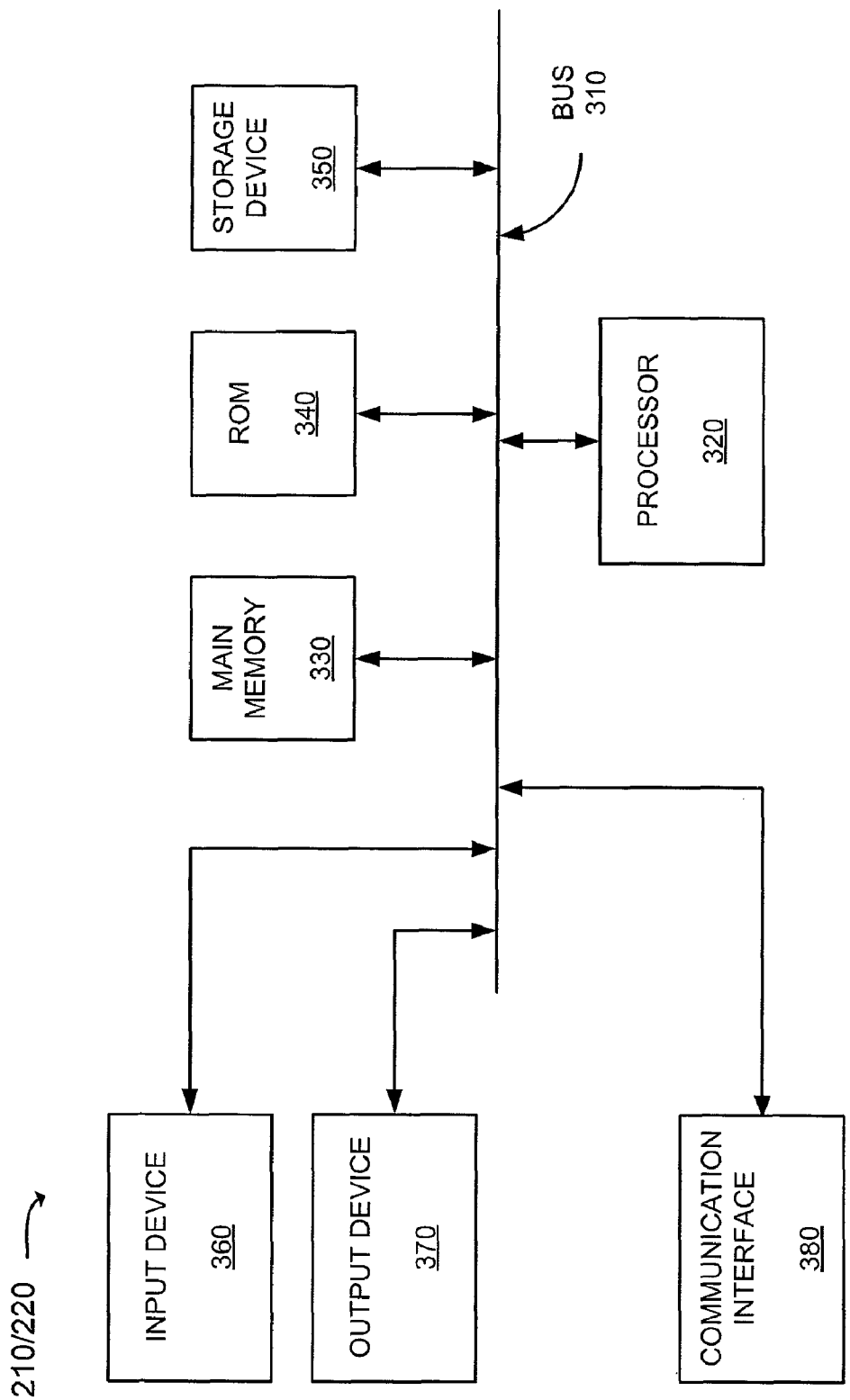
FIG. 3 is an exemplary diagram of a device which may correspond to one or more of the clients or the server shown in FIG. 2.

FIG. 3 is an exemplary diagram of a device which may correspond to one or more of clients 210 and/or server 220. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that interprets and executes instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

Device 210/220 may perform certain operations, as will be described in detail below, in response to processor 320 executing software instructions contained in a computer-readable medium, such as memory 330. A computer-readable medium may be defined as a physical or logical memory device.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Search System

Figure 4:
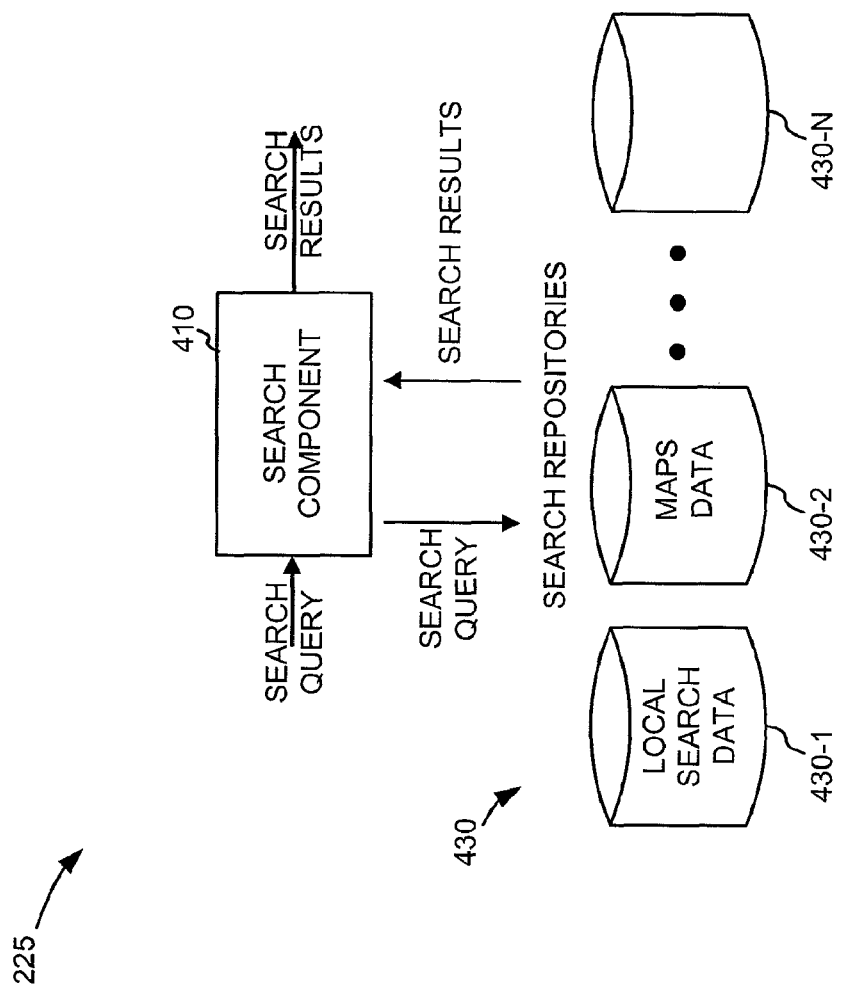
FIG. 4 is a diagram illustrating an exemplary implementation of a local search engine.

FIG. 4 is a diagram illustrating an exemplary implementation of local search engine 225. Local search engine may include a search component 410 and a set of search repositories 430. In general, search component 410 may submit search queries to one or more of search repositories 430-1 through 430-N (collectively referred to as search repositories 430) and receive search results back from search repositories 430.

Search repositories 430 may each include an indexed set of data of a particular type or category. For example, as shown in FIG. 4, search repository 430-1 may include local search data.

Local search data may include an index of businesses, web pages, reviews, or other information that is associated with a geographic location. Search repository 430-2 may include maps data. The maps data may include the names and locations of roads, neighborhoods, cities, and countries. Maps data repository 430-2 may be searchable by geographic location, such as that provided by keywords, such as an address (e.g., street address, zip code, etc.). Maps data repository 430-2 may return map data, such as a graphical map or a set of coordinates, such as latitude and longitude, that correspond to the search query input to search repository 430-2.

Search repositories 430 may also be associated with appropriate hardware/software to perform a search of the data in the repository. For example, local search data repository 430-1 may include one or more computing devices, such as server 220, that can receive a search query from search component 410 and return search results, such as links to relevant documents, in response to the search query. The search results may additionally include relevance or quality scores associated with the search results. These scores may be used by search component 410 to obtain a confidence score that measures how confident the search repository is in the search results. A confidence score for a particular set of search results may be calculated, for example, as the sum or average of the relevance scores of a certain number of the search results (e.g., as an average relevance score of the five most relevant search results). As another example, the confidence score for a particular set of search results may be calculated as the highest (i.e., most relevant) normalized relevance score in the set of search results.

In some implementations, repositories 430 may be implemented as a single repository that contains multiple types of search data.

In operation, search component 410 may receive a search query from a user, such as from a user of a client 210 over network 250. The search query may be a search query for a local search and may be received as a single phrase. That is, the search query may have been entered by the user in a single text box in which the user did not explicitly define which part of the search query relates to what the user is searching for (the "what" portion of the search query) and which part of the search query relates to the geographic location of interest to the user (the "where" portion of the search query).

Figure 5:
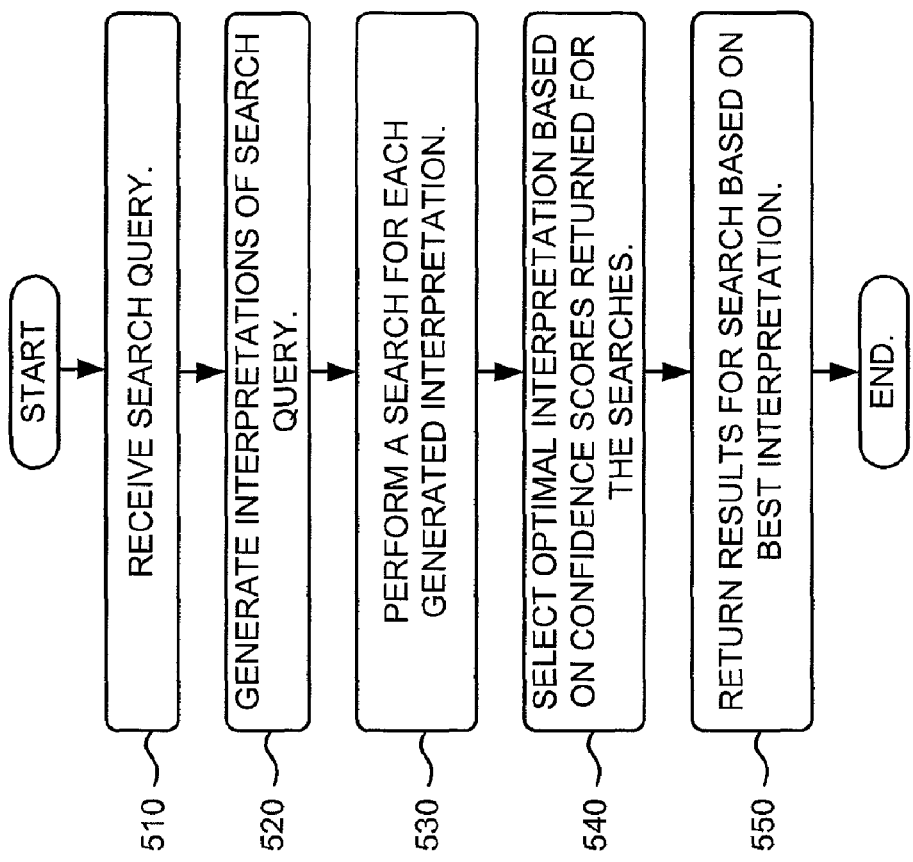
FIG. 5 is a flow chart illustrating exemplary operations of a local search engine.

FIG. 5 is a flow chart illustrating exemplary operations of local search engine 225. To begin, local search engine 225 may receive a local search query from a user (act 510). As previously mentioned, the search query may be entered into a single text box in which the "what" and "where" parts of the search query are not explicitly defined by the user.

Search component 410 may generate a number of possible interpretations, also called "splits" herein, of the search query (act 520). For example, the search query may be split into a number of possible what and where portions. In some implementations, every possible split may be considered for the query. In alternate implementations, rules or heuristics may be applied to attempt to intelligently select a subset of the possible splits for the search query. Further, it may be possible that either the what or where portion is empty or that a split may include one or more terms that are in both the what and where portions.

Search component 410 may perform a search based on each generated interpretation (act 530). The search may include transmitting the where portion of the search query to maps data repository 430-2. In response, maps data repository 430-2 may generate geographic coordinate information, such as latitude and longitude values or other coordinate information. The geographic coordinate information may be sent with the what portion of the query to local search data repository 430-1 to obtain search results that are both relevant to the what portion of the query and the location defined by the coordinate information.

As previously mentioned, a set of search results returned from local search data repository 430-1, and potentially also from maps data repository 430-2, may be associated with query dependent relevance scores that define how relevant each result is to the search query. Search component 410 may use these relevance scores to generate a value, called a confidence score herein, that indicates a level of confidence of the set of search results for the query.

In one implementation, the searches based on each generated interpretation, (act 530), may generally be performed in parallel with one another. That is, search component 410 may simultaneously or asynchronously submit the search queries that define the different search interpretations to search repositories 430. The search queries may then be processed in parallel by search repositories 430 and returned to search component 410 as they are completed.

Based on the confidence scores, search component 410 may select an optimal or "best" one of the search query interpretations (act 540). For example, the search query interpretation with the highest confidence score may be selected as the best search query interpretation. In some implementations, the "best" interpretation may be a merged set of results from multiple interpretations.

The search results corresponding to the best search query interpretation may be returned to the user (act 550). For example, local search engine 225 may transmit a web page to the user that includes links to the most relevant local search results. In some implementations, descriptive information associated with the result, such as, for business listings, a telephone number and address of the business listing, may be included in the web page. Additionally, a graphical map of the geographic location that was determined to correspond to a geographic location associated with the "where" portion of the best interpretation may also be included in the web page.

Figure 6:
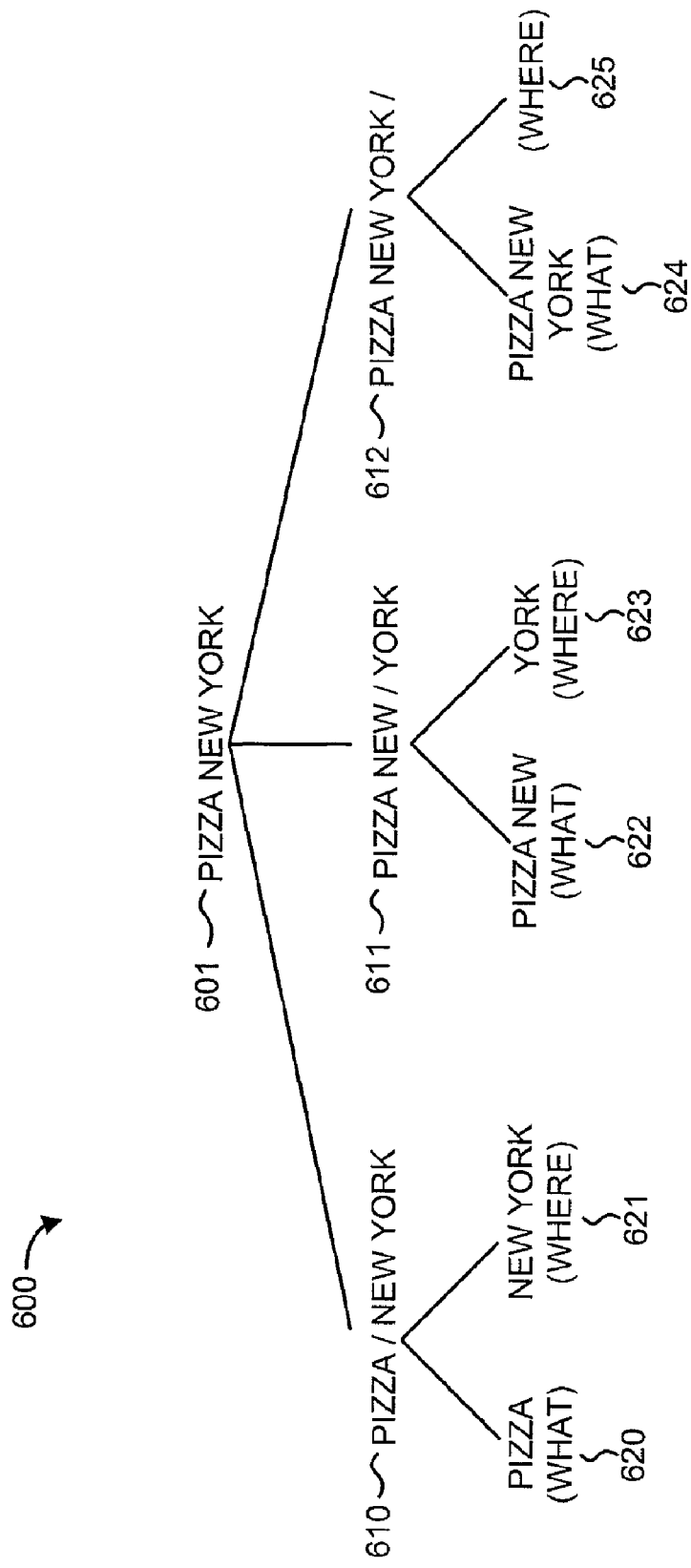
FIG. 6 is a diagram conceptually illustrating one exemplary implementation of the generation and evaluation of search query interpretations.

The generation of the search query interpretations and the evaluations of the search query interpretations may be performed in a number of ways. FIG. 6 is a diagram conceptually illustrating one exemplary implementation of the generation and evaluation of search query interpretations (i.e., acts 520 and 530) in additional detail.

As shown in FIG. 6, a tree structure 600 is used to create a search plan by which query interpretations are explored. Tree 600 may include: a root node 601 that corresponds to the received search query; child nodes 610-612 of the root node, each of which correspond to a hypothesized split of the search query; and grandchild nodes 620-625, where each of the grandchild nodes represent either the "what" or "where" portion of the hypothesized split of its parent node.

In the example of tree structure 600, root node 601 corresponds to the search query "pizza new york," entered by the user Three possible interpretations of this search query, shown in child nodes 610-612, are enumerated in tree 600. In child nodes 610-612, the split between the what and the where portions of the query are indicated by a "/". As shown, child node 610 corresponds to the interpretation in which "pizza" is the what portion of the query and "new york" is the where portion. Child node 611 corresponds to the interpretation in which "pizza new" is the what portion of the query and "york" is the where portion. Child node 612 corresponds to the interpretation in which "pizza new york" is the what portion of the query and the where portion is empty. From each of child nodes 610-612, two grandchild nodes are shown, in which one of the grandchild nodes of a pair represents the what portion of the query and the other represents the where portion of the query. For child node 610, for instance, grandchild node 620 (the what portion of the query) is associated with the search query "pizza" and grandchild node 621 is associated with the search query "new york." For child node 611, grandchild node 622 (the what portion of the query) is associated with the search query "pizza new" and grandchild node 623 (the where portion of the query) is associated with the search query "york." For child node 612, grandchild node 624 (the what portion of the query) is associated with the search query "pizza new york" and grandchild node 625 (the where portion of the query) is empty (i.e., it is not associated with a search term).

Figure 7:
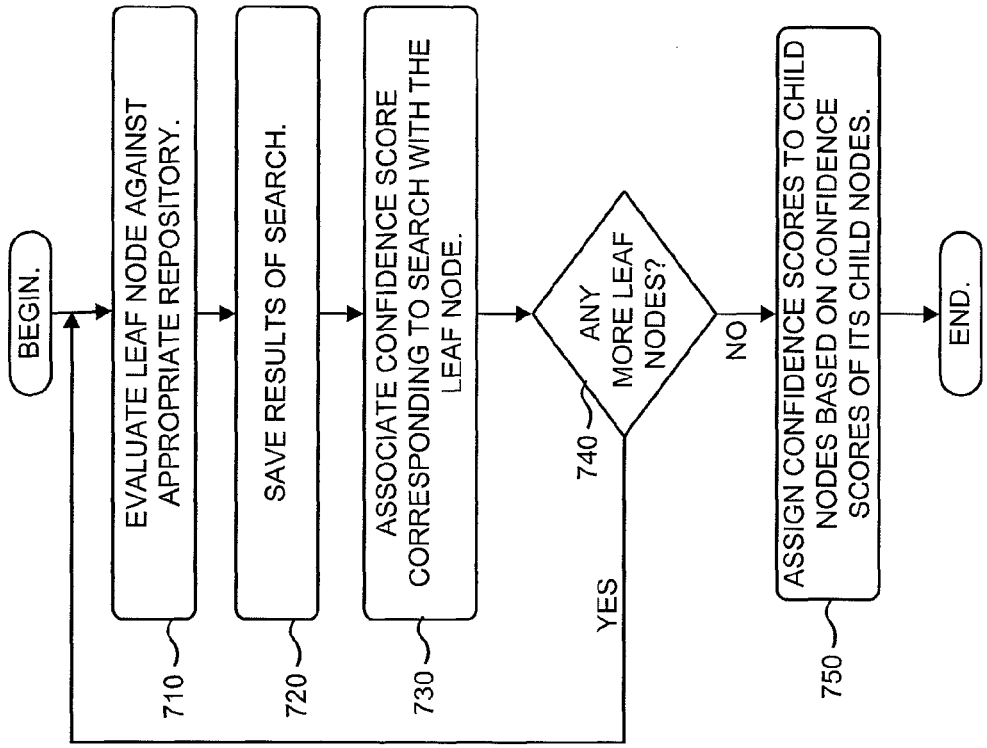
FIG. 7 is a flow chart illustrating exemplary operations for evaluating a tree structure that represents a search plan.

FIG. 7 is a flow chart illustrating exemplary operations for evaluating a tree structure that represents a search plan, such as tree structure 600. A leaf node in the tree may be evaluated (act 710). Leaf nodes are shown as the "end" nodes in tree structure 600, i.e., nodes 620-625. Evaluating a leaf node 620 may correspond to performing a search of the terms of the leaf node with the search repository 430 that is specified by the leaf node. In tree structure 600, for instance, leaf node 621, which corresponds to the search term "new york," may be submitted to maps data repository 430-2. The result of this search, such as the geographic location corresponding to the search and a confidence score associated with the search, may be saved (act 720). Further, the returned confidence score may be associated with node 621 (act 730). Acts 710-730 may be repeated for each leaf node in tree structure 600 (act 740).

In some situations, the where portions of the search query, when evaluated by maps data repository 430-2, may return an ambiguous result. For example, there are a number of towns called Springfield, and accordingly, a search for "Springfield" in maps data repository 430-2 may yield a number of plausible geographic locations. In one implementation, search component 410 may handle ambiguous where portions of a search query by expanding the ambiguous where portion into multiple different non-ambiguous where portions and submitting these non-ambiguous where portions, potentially in parallel, to local search data repository 430-1. For the search query "Springfield," for instance, search component may submit the search queries "Springfield, Me.", "Springfiled, Ill.", and "Springfield, Va." In this manner, search component 410 may disambiguate an ambiguous where portion of a search query split.

In some implementations, acts 710-740 may be performed in parallel or partially in parallel with one another. For instance, search component 410 may asynchronously submit the search queries of leaf nodes 620-625 to search repositories 430. A search repository 430 may itself be implemented by one or more computing devices, which may each independently execute the received search query and return it to search component 410.

Confidence scores may next be assigned to each child node based on the confidence scores of the children of the child node (i.e., leaf nodes 620-625 in this example) (act 750). For example, the confidence score of child node 610 may be calculated as the sum of the confidence scores of leaf nodes 620 and 621. In this manner, all of the children of root node 601 may be explored and associated with a confidence score. The optimal split may be selected as the interpretation corresponding to the child node with the highest confidence score (FIG. 5, act 540). For tree structure 600, the optimal interpretation will likely correspond to node 610 because both "pizza" and "new york" are likely to return high confidence scores for searches of local search data repository 430-1 and maps data repository 430-2, respectively.

Figure 8:
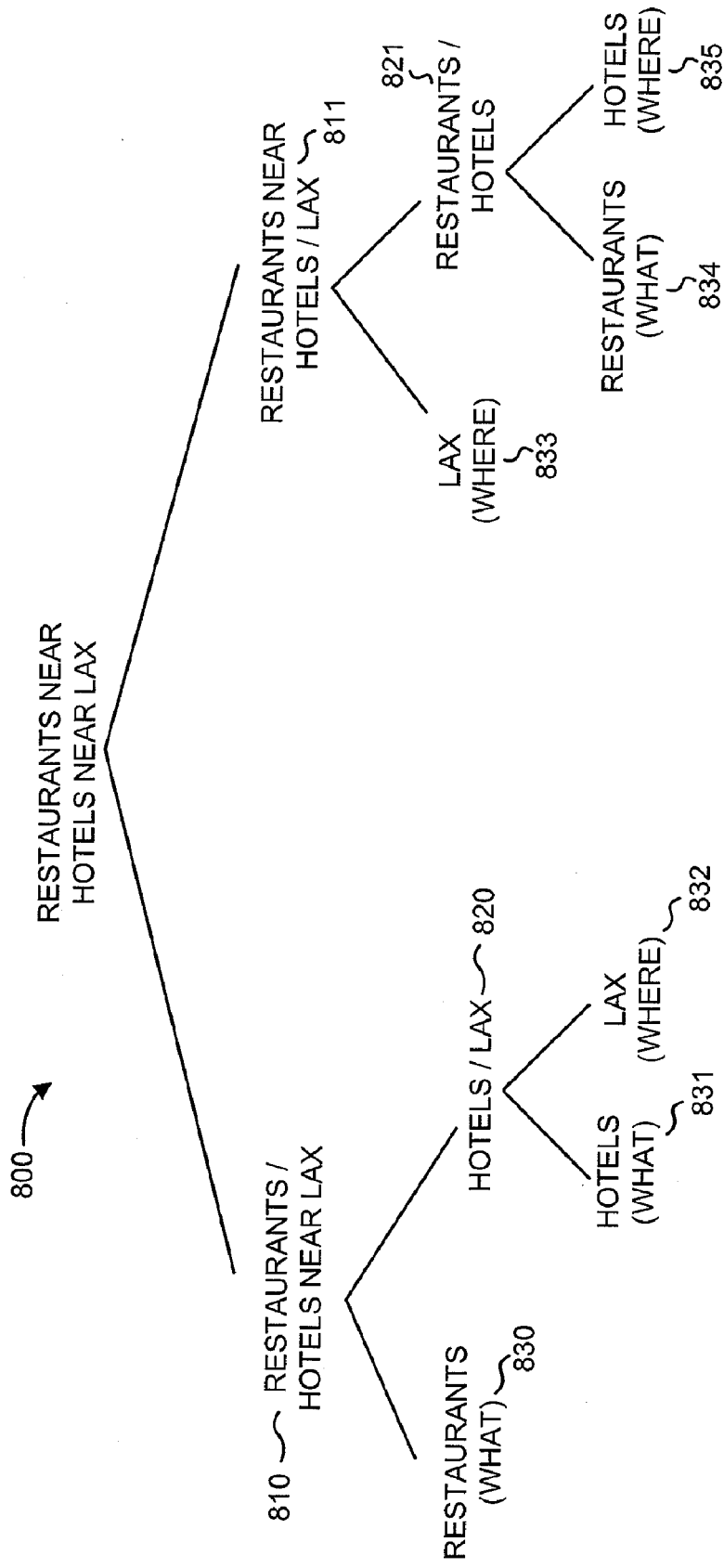
FIG. 8 is a diagram conceptually illustrating a portion of an exemplary multi-level tree structure for the generation and evaluation of search query interpretations.

FIG. 8 is a diagram conceptually illustrating a portion of an exemplary tree structure 800 for the generation and evaluation of search query interpretations in which the tree structure includes multiple levels of child nodes. Tree structure 800 may be evaluated by search component 410 in a recursive manner. Assume that the initial query in this example is "restaurants near hotels near lax". At first level child node 810, the query is split so that "restaurants" is the what portion of the query and "hotels near lax" is the where portion. At first level child node 811, the query is split so that "restaurants near hotels" is the what portion of the query and "lax" is the where portion. Tree structure 800 additionally includes two second level child nodes 820 and 821. At second level child node 820, the where portion of the query from node 810 is further split so that "hotels" is the what portion of the query and "lax" is the where portion, as indicated by leaf nodes 831 and 832, respectively. At second level child node 821, the what portion of the query from node 811 is interpreted so that "restaurants" is the what portion of the query and "hotels" is the where portion, as indicated by leaf nodes 834 and 835, respectively.

Leafs 830-835 may be evaluated against repositories 430 in the manner similar to that described above with respect to tree structure 600. That is, in tree structure 800, the confidence scores of leafs 831 and 832 may indicate that the query should be interpreted as directed to hotels near the Los Angeles airport. The confidence score of leaf 830 may further indicate that restaurants are desired near the hotels near the Los Angeles airport.

In the example search query interpretations shown in FIGS. 6 and 8, the search queries were split in a non-overlapping manner. In some implementations, however, the what and where portions of search queries may overlap one another. Consider the search query "Newark airport." One interpretation of this query is to use "Newark" as the where portion of the query and "airport" as the what portion. A second possible interpretation, however, is to use "Newark airport" as the what portion and "Newark" as the where portion. Because the term "Newark" is relevant to both the location in which the user is interested and describes what the user is interested in, this second query is likely to have a higher confidence score than the first query. As another example, consider the query "bronx zoo." The best interpretation for this query may be to split the query so that "bronx zoo" is the what portion of the query and "bronx" is the where portion of the query.

As described above, by exploring multiple possible interpretations for a single search query, the interpretation that is likely to be the best or optimal interpretation can be determined. The individual search queries associated with the possible interpretations can be performed in parallel, thus potentially allowing the search query exploration to be performed quickly.

A number of refinements can be made to the above-described techniques for partitioning a search query. In one such refinement, user context information can be used to supplement the what or where portions of the search query interpretation. If the user is currently viewing information related to a geographic location, such as a map of a particular area, search component 410 may use the map area being currently viewed to influence the what portion of the query interpretation. For example, if the user is viewing a map of New York City and searches for "Hilton," search component 410 may interpret the search query as a search for "Hilton" in the location "New York City." Other information can also be used as context information that may supplement the what or where portions of a search query interpretation. For example, the search query interpretation may be supplemented by:

geographic location information obtained from the user's IP address, geographic location information or other information obtained from a profile previously registered by the user with local search engine 225, information based on the search history of the user, information based on the viewing history of the user, information based on the language of the search query, and/or information based on the hostname through which the user accessed local search engine 225. In general, this user context information can be used to more intelligently generate the search query interpretations.

Two repositories, local search data repository 430-1 and maps data repository 430-2, were specifically discussed above as search repositories to which search component 410 may submit search queries. More generally, additional repositories may be used by search component 410. The additional repositories can include, for example, without limitation, repositories relating to local traffic information, events occurring in a particular area, real-estate, driving directions, or local coupons.

In operation, when using additional repositories, search component 410 may generate possible interpretations of the search query in a manner similar to that described above, except that instead of limiting the search query to a maximum of two partitions, an additional possible partition may be used for each additional repository. In the context of tree structure 600, for instance, each child node 610-612 may have three or more leaf nodes in which the search terms corresponding to the leaf nodes may or may not overlap with one another.

As an example of a search using three repositories, consider the search query "pizza new york" and assume that in addition to local search data repository 430-1 and maps data repository 430-2, a traffic data repository is used by search component 410. The traffic repository may keep track of local road traffic information for particular geographic areas. One possible search query interpretation may be a partition in which "pizza" is sent to local search data repository 430-1, "new york" is sent to maps data repository 430-2, and "new york" is sent to the traffic data repository. The result of the search query may then be returned to the user as a list of pizza restaurants in New York City and information describing traffic in the vicinity of the restaurants.

In some implementations, local search engine 225 may also return driving directions. For some search queries, the best interpretation for the query may be as a request for driving directions. For example, the search query "sfo to sf" may be interpreted as a request for driving directions from the San Francisco Airport to downtown San Francisco. Local search engine 225 may include the possibility of returning driving directions by using one of search repositories 430 as a repository that returns driving directions. A high confidence score for a query submitted to this repository may indicate that driving directions or a link to driving directions should be returned to the user.

In some implementations, the possible query partitions to use, such as the possible query partitions shown in nodes 610-612 of FIG. 6, may be generated by search component 410 using a statistical model that attempts to predict likely partitions. Instead of generating all possible partitions of a search query, search component 410 may only consider query partitions that the statistical model determines to be likely to be an optimal search query partition. By reducing the number of possible search query partitions in this manner, the number of searches submitted to search repositories 430 can be reduced relative to a brute force approach to generating query partitions. Advantageously, this can reduce the processing load for local search engine 225.

A particularly long search query can result in a large search plan, which may make the search prohibitively expensive in terms of network bandwidth and processor usage. In one implementation, in this situation, search component 410 may, instead of performing each of the generated search interpretations in parallel using repositories 430, search component 410 may perform some of the search interpretations in series. The statistical model may be used to order the searches so that the most promising search interpretations are submitted before less promising search interpretations. For example, the statistical model may assign a probability estimate to each generated query interpretation. The probability estimates can be used to order the searches that are sent to repositories 430. If a particular search interpretation has a high enough confidence score, such as one above a predetermined threshold, the exploration of the search query may be stopped relatively quickly by search component 410.

In some implementations, the number of query interpretations generated by search component 410 may be limited to a maximum number. By limiting the number of possible queries submitted to repositories 430 for a single search, the total load on repositories 430 can be controlled. In one implementation, the maximum number may be adjusted based on factors such as total load of repositories 430. In this manner, search component 410 can strike a balance between parsing effectiveness and system load.

In some situations, ambiguous queries may produce multiple different interpretations that each have similar confidence scores. In one implementation, search component 410 may apply an intelligent scoring scheme in order to compare and combine result sets. For example, search component 410 may consider factors such as the likelihood of a query partition, the prior probability of a query partition of a given type, the confidence scores of the returned results, and the distance between the centroid of the returned results and the user's current context. Still further, information associated with the user may be used to determine the confidence in a particular query partition. For example, information based on the user's IP-determined geolocation, a cookie corresponding to the user, or the domain from which the user accessed the site may be used in determining the confidence in a particular query partition.

In another implementation, an ambiguous query received from a user may be handled by prompting the user for additional information. For example, for the query "pizza near 3rd", search component 410 may prompt the user to select which of "pizza near 3rd street" or "pizza near 3rd avenue" is the more appropriate search query.

In some implementations, search component 410 may look for key words or phrases in the query that tend to indicate the user's intention. These key words or phrases may be stored as a predetermined list of such words or phrases. The list may be manually compiled or automatically generated by, for example, an analysis of query logs. As an example of one such phrase, consider the phrase "getting to" in the context of the search query "getting to jfk." Search component 410 may recognize the phrase "getting to" as a phrase that is associated with a request for driving directions. Accordingly, search component 410 may provide driving directions to the location returned for the where portion of the search "jfk" (i.e., JFK airport). The driving directions may be provided from the current location being viewed by the user or from another location In some implementations, search component 410, when returning the results of a search to the user, may occasionally request that the user specify the correct interpretation of the user's query or indicate whether the interpretation chosen by search component 410 is correct. These user responses may be collected and be used to further train search component 410 for future searches.

EXAMPLE LOCAL SEARCH

Figure 9:
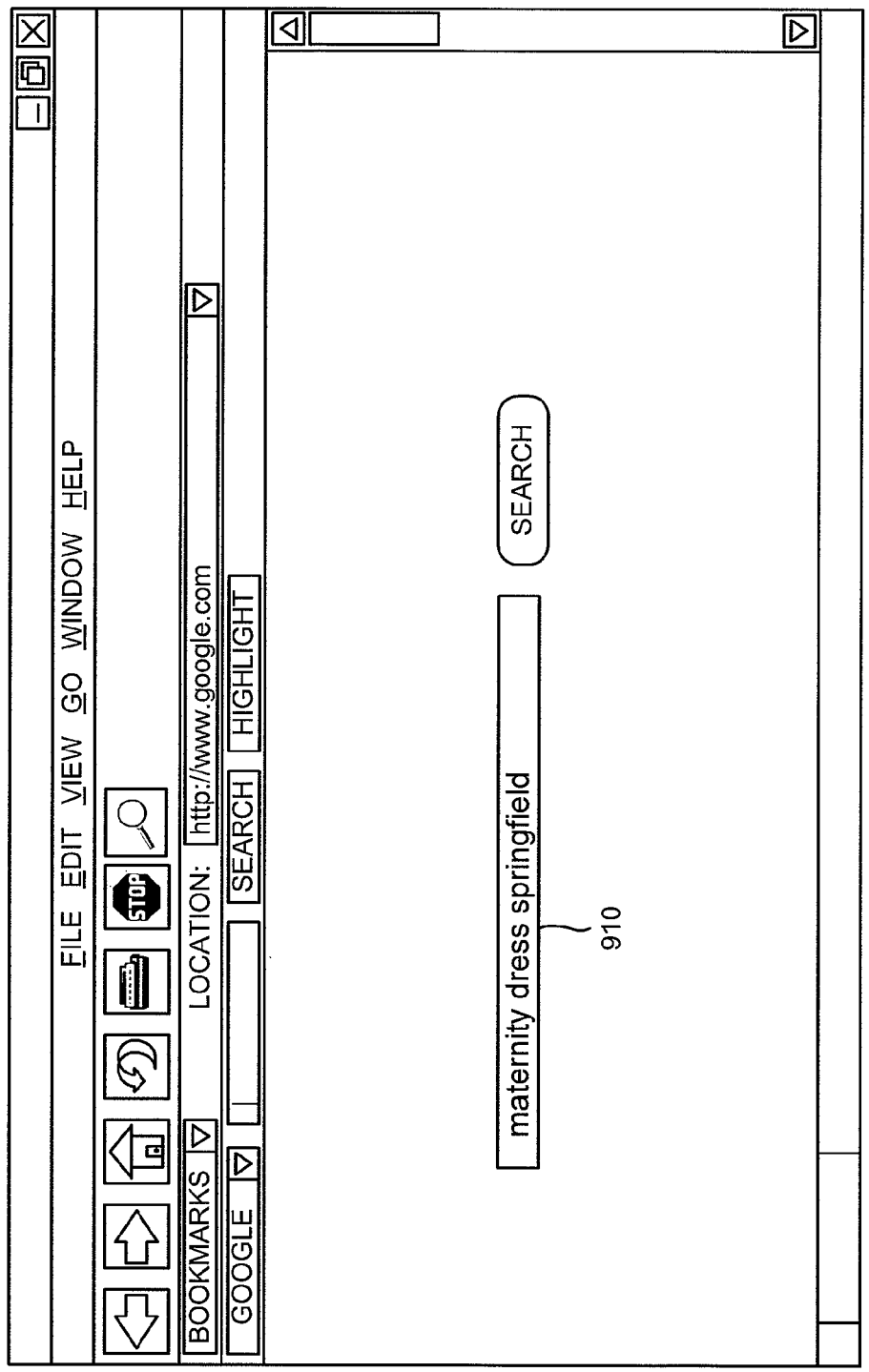
FIGS. 9-11 are exemplary diagrams of user interfaces that may be presented to a user.
Figure 10:
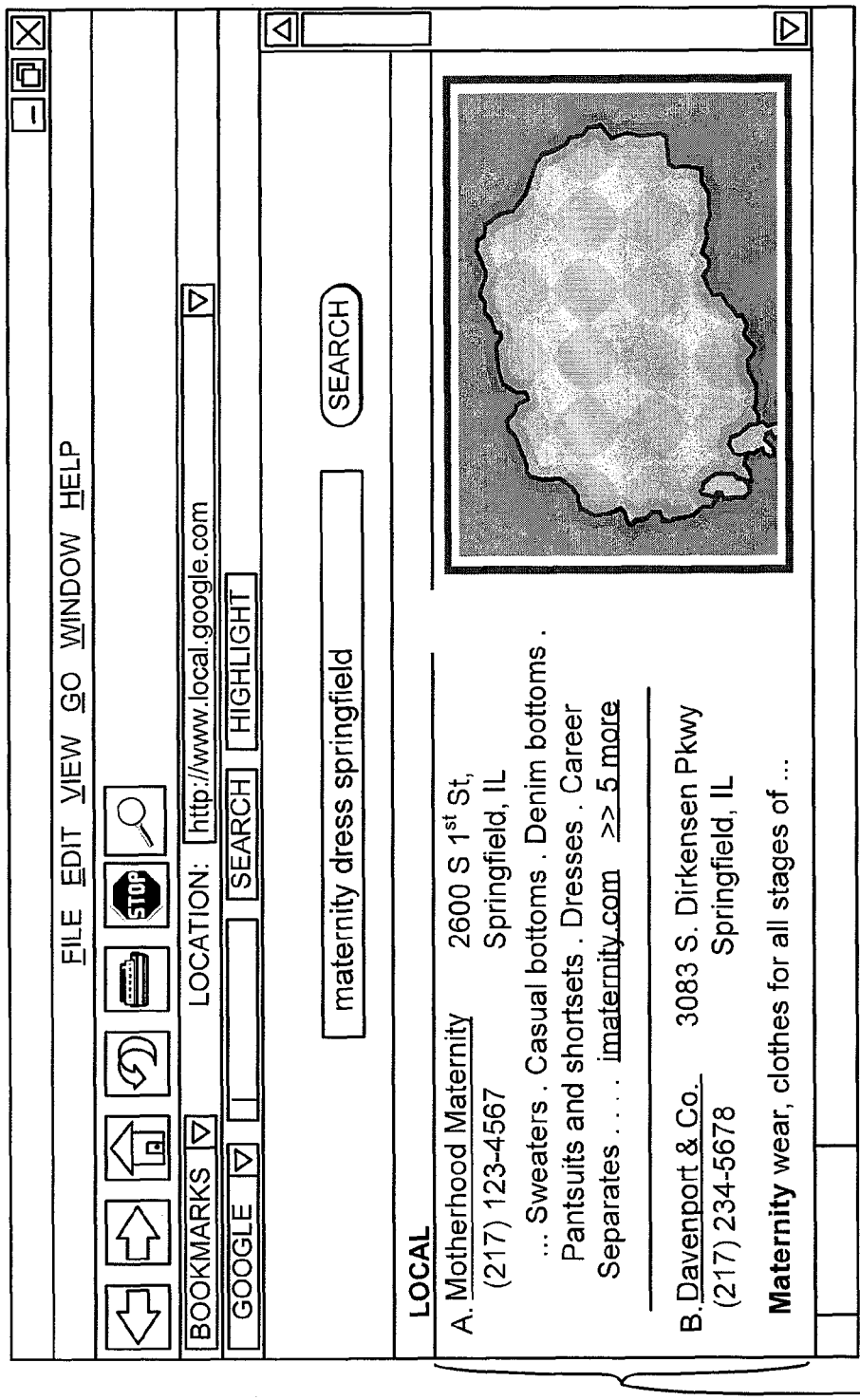
Figure 11:
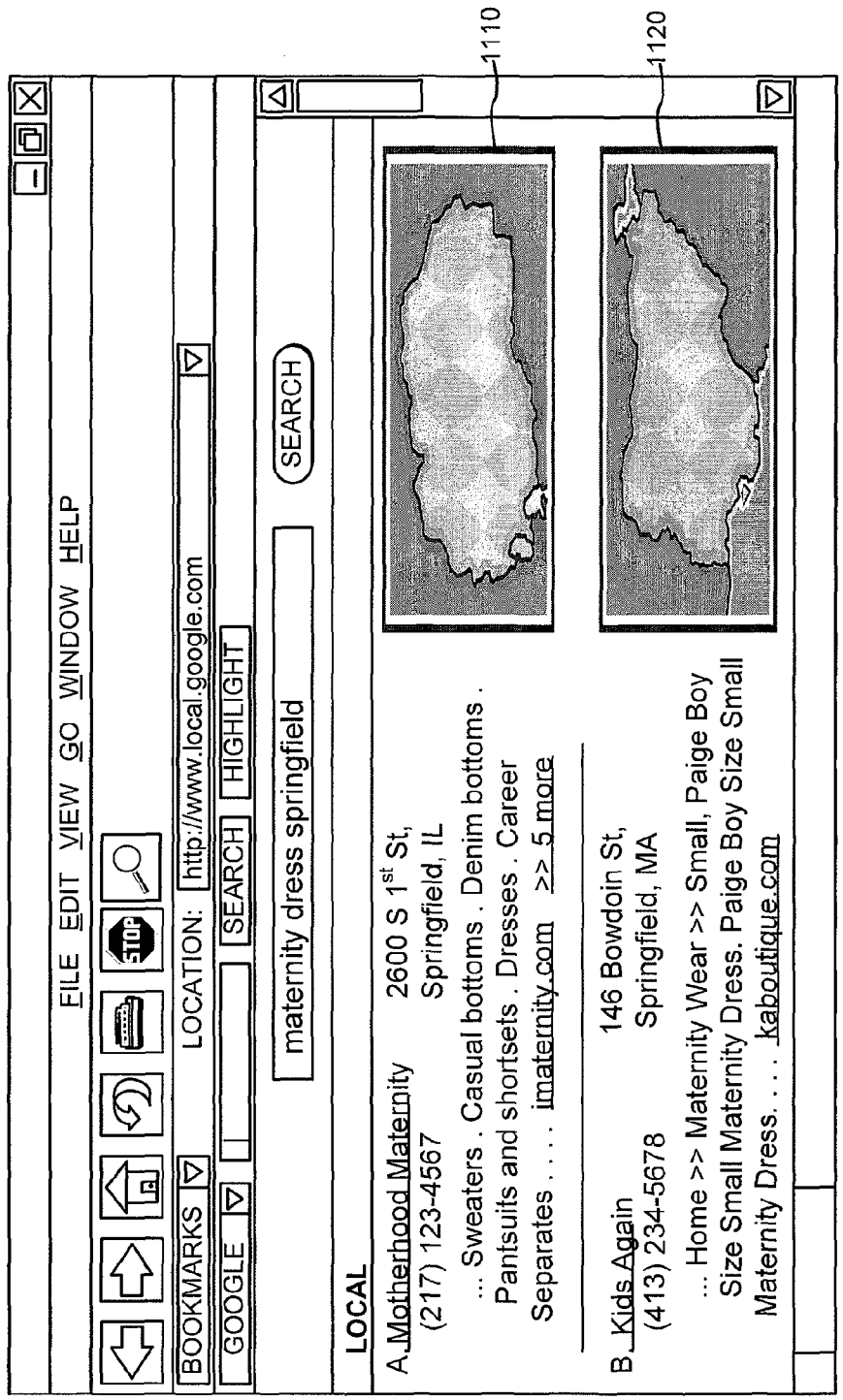

FIGS. 9-11 are exemplary diagrams of user interfaces that may be presented to a user in response to a local search submitted to local search engine 225. Assume that the user has accessed an interface associated with a search system, such as local search engine 225. As shown in FIG. 9, the user may enter one or more search terms of a search query via a single data entry field (e.g., a single search box) 910. In this case, the user has entered the search terms "maternity dress springfield".

As described above, local search engine 225 may generate a number of possible query interpretations for this query. Each interpretation may be split to include a what portion and a where portion that is sent to a local search repository and a map repository, respectively. In this case, local search engine 225 may determine that "springfield" corresponds to the where portion of the query and "maternity dress" corresponds to the what portion of the query.

FIG. 10 is a diagram of an exemplary user interface in which local search results are shown to a user. As shown in FIG. 10, the search system may present local search results 1000 in response to the search query. In this example, local search results 1000 may be provided in an interface that includes, for each result document, address information for the business associated with the document, a telephone number for the business, a snippet from the document or another document associated with the business, a link to more information associated with the business, a link to directions to the business, and/or a link to one or more documents that refer to the business. The user interface may also provide a map of the area covered by the search. The map may optionally include pointers to businesses or addresses associated with local search results 1000 (or some set of local search results 1000). In situations in which the "what" portion of the query is ambiguous as to whether the user is interested in addresses or businesses, the map may include pointers to both addresses and businesses FIG. 11 is a diagram of another exemplary user interface in which local search results are shown to a user. FIG. 11 is similar to FIG. 10, except in FIG. 11, two different maps, maps 1110 and 1120, are shown. This may be desirable in situations in which the what portion of the search query is determined to be ambiguous. In this example, there may be multiple cities named "Springfield" that have businesses that sell maternity dresses.

CONCLUSION

Techniques described herein may interpret a single local search query to obtain multiple portions of the search query, such as the what and where portions for a local search. Multiple candidate interpretations may be explored in parallel to quickly obtain an optimal interpretation.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 5 and 7, the order of the acts may be modified in other implementations consistent with the principles of the invention. Further, non-dependent acts may be performed in parallel.

Further, exemplary user interfaces have been described with respect to FIGS. 9-11. In other implementations consistent with the principles of the invention, the user interfaces may include more, fewer, or different pieces of information.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by one or more processors of one or more server devices and from a client device, a search query that includes a plurality of terms;
determining, by one or more processors of one or more server devices, a plurality of splits of the search query, where each of the plurality of splits separate the search query into a different plurality of partitions, where each of the plurality of partitions, in a split, includes one or more of the plurality of terms, and where a first partition, of the plurality of partitions, is associated with a geographic area;
performing, by one or more processors of one or more server devices and for each of the plurality of splits, a search of a plurality of repositories to identify documents responsive to respective ones of the plurality of partitions in that split, where the plurality of repositories include a map data repository, and where the map data repository is searched to identify a location responsive to the first partition of the plurality of partitions;
determining, by one or more processors of one or more server devices, a respective confidence score for each of the plurality of splits based on scores associated with the documents identified for the plurality of partitions in that split;
selecting, by one or more processors of one or more server devices, a split, of the plurality of splits, based on the confidence scores for the plurality of splits; and
transmitting, by one or more processors of one or more server devices to the client device, a listing of the documents identified for the plurality of partitions for the selected split, as search results for the search query.

2. The method of claim 1, further comprising:
limiting a number of the plurality of splits to less than a maximum number.

3. The method of claim 1, where the plurality of repositories include a local search data repository.

4. The method of claim 1, where determining the plurality of splits of the search query includes:

determining each split, of the plurality of splits, based on a tree structure, where each one of the plurality of partitions, for a split, is associated with a leaf node of the tree structure and with one of the plurality of repositories.

5. The method of claim 1, where the search query is submitted by a user, and where the method further comprises:
supplementing the search query to include additional terms based on context information associated with the user.

6. The method of claim 5, where the context information includes information derived from at least one of:
an IP address associated with the user,
a profile of the user,
a search history of the user,
a language of the search query submitted by the user, or
a hostname associated with the user.

7. The method of claim 1, where the plurality of repositories further include at least one of:
a repository storing traffic information,
a repository storing information regarding events occurring in an area,
a repository storing real-estate information,
a repository storing driving directions, or
a repository storing coupon information.

8. The method of claim 1, where determining each split, of the plurality of splits, is based on a statistical model to predict the plurality of partitions for that split.

9. The method of claim 1, where determining the plurality of splits of the search query is based on context information associated with the client device, and where the context information is associated with map data displayed on the client device.

10. A computer-readable medium comprising:
one or more instructions which, when executed by one or more processors, cause the one or more processors to receive, from a client device, a search query that includes a plurality of terms;
one or more instructions which, when executed by the one or more processors, cause the one or more processors to determine a plurality of splits of the search query, where each of the plurality of splits separates the search query into a different plurality of partitions, where each of the plurality of partitions, in a split, includes one or more of the plurality of terms, and where a first partition, of the plurality of partitions, is associated with a geographic area;
one or more instructions which, when executed by the one or more processors, cause the one or more processors to perform, for each of the plurality of splits, a search of a plurality of repositories to identify documents responsive to respective ones of the plurality of partitions in that split, where the plurality of repositories include a map data repository, and where the map data repository is searched to identify a location responsive to the first partition of the plurality of partitions;
one or more instructions which, when executed by the one or more processors, cause the one or more processors to determine a respective confidence score for each of the plurality of splits based on scores associated with the documents identified for the plurality of partitions in that split;
one or more instructions which, when executed by the one or more processors, cause the one or more processors to select a split, of the plurality of splits, based on the confidence scores for the plurality of splits; and
one or more instructions which, when executed by the one or more processors, cause the one or more processors to transmit, to the client device, a listing of the documents identified for the plurality of partitions for the selected split, as search results for the search query.

11. The computer-readable medium of claim 10, where the context information is associated with map data displayed on the client device.

12. The computer-readable medium of claim 10, where the context information further includes information derived from at least one of:
an IP address associated with the client device,
a profile associated with the client device,
a search history associated with the client device,
a language of the search query, or
a hostname associated with the client device.

13. The computer-readable medium of claim 10, further comprising:
one or more instructions to add, for one of plurality of splits, at least one additional term to one or more of the plurality of partitions in that split, where the at least one additional term is based on the context information.

14. The computer-readable medium of claim 10, where the one or more instructions to determine the plurality of splits include:
one or more instructions to limit a number of the plurality of splits to less than a maximum number.

15. The computer-readable medium of claim 10, where determining each split, of the plurality of splits, is further based on a tree structure, where each one of the plurality of partitions, for a split, is associated with a leaf node of the tree structure and with one of the plurality of repositories.

16. The computer-readable medium of claim 10, where determining each split, of the plurality of splits, is further based on a statistical model to predict the plurality of partitions for that split.

17. A device comprising:
a memory to store instructions; and
a processor to execute the instructions to:
receive, from a client device, a search query that includes a plurality of terms;
determine a a plurality of splits of the search query, where each of the plurality of splits separates the search query into a different plurality of partitions, where each of the plurality of partitions, in a split, includes one or more of the plurality of terms, and where a first partition, of the plurality of partitions in a split, is associated with a geographic area;
perform, for each of the plurality of splits, a search of a plurality of repositories to identify documents responsive to respective ones of the plurality of partitions in that split, where the plurality of repositories include a map data repository, and where the map data repository is searched to identify a location responsive to the first partition, of the plurality of partitions;
determine a respective confidence score for each of the plurality of splits based on scores associated with the documents identified for the plurality of partitions in that split;
select a split, of the plurality of splits, based on the confidence scores for the plurality of splits; and
transmit, to the client device, a listing of the documents identified for the plurality of partitions for the selected split as search results for the search query.

18. The device of claim 17, where the processor is further to determine each split, of the plurality of splits, based on context information associated with the client device.

19. The device of claim 18, where the context information is associated with map data displayed on the client device.

20. The device of claim 18, where the context information includes information derived from at least one of:
- an IP address associated with the client device,
- a profile associated with the client device,
- a search history associated with the client device,
- a language of the search query, or
- a hostname associated with the client device.

21. The device of claim 18, where the processor is further to:
- add, to one or more of the plurality of partitions in a split, at least one additional term, where the at least one additional term is based on the context information.

22. The device of claim 17, where the processor is further to:
- limit a number of the plurality of splits to less than a maximum number.

23. The device of claim 17, where the processor, when determining each split, of the plurality of splits, is further to:
- split the search query based on a tree structure, where each one of the plurality of partitions, in a split, is associated with a leaf node of the tree structure and with one of the plurality of repositories.

24. The device of claim 17, where the processor is further to determine each split, of the plurality of splits, based on a statistical model to predict the plurality of partitions for that split.

25. A method for determining how to split terms of a search query into a plurality of partitions, where at least one partition relates to a subject of the search query and at least one partition relates to a location for the search query, the method comprising:
- receiving, by a processor, a search query having a plurality of terms;
- splitting, by a processor, the search query into a plurality of splits, where each split includes a plurality of partitions including a first partition that relates to the subject of the search query and a second partition that relates to the location of the search query, and where each partition includes one or more terms from the search query;
- searching, by a processor and for each split of the search query, a plurality of data repositories for documents responsive to respective ones of the plurality of partitions in that split;
- determining, by a processor, confidence scores for each split based on the documents found responsive to the plurality of partitions in that split; and
- determining, by a processor, how to split the search query based on the determined confidence scores.

26. The method of claim 25, where splitting the search query into a plurality of splits is based on context information associated with a client device.

27. The method of claim 26, where the context information is associated with map data displayed on the client device.

28. The method of claim 26, where the context information further includes information derived from at least one of:
- an IP address associated with the client device,
- a profile associated with the client device,
- a search history associated with the client device,
- a language of the search query, or
- a hostname associated with the client device.

29. The method of claim 26, further comprising:
- adding, to one or more of the plurality of partitions, at least one additional term based on the context information.

30. The method of claim 25, where a quantity of the plurality of splits is less than a maximum number.

31. The method of claim 25, where splitting the search query into the plurality of splits is further based on a tree structure, where each one of the plurality of splits is associated with a leaf node of the tree structure and with one of the plurality of repositories.

32. The method of claim 25, where splitting the search query into the plurality of splits is further based on a statistical model to predict the plurality of splits.

* * * * *